H. B. WALLACE.
TIRE.
APPLICATION FILED AUG. 18, 1916.

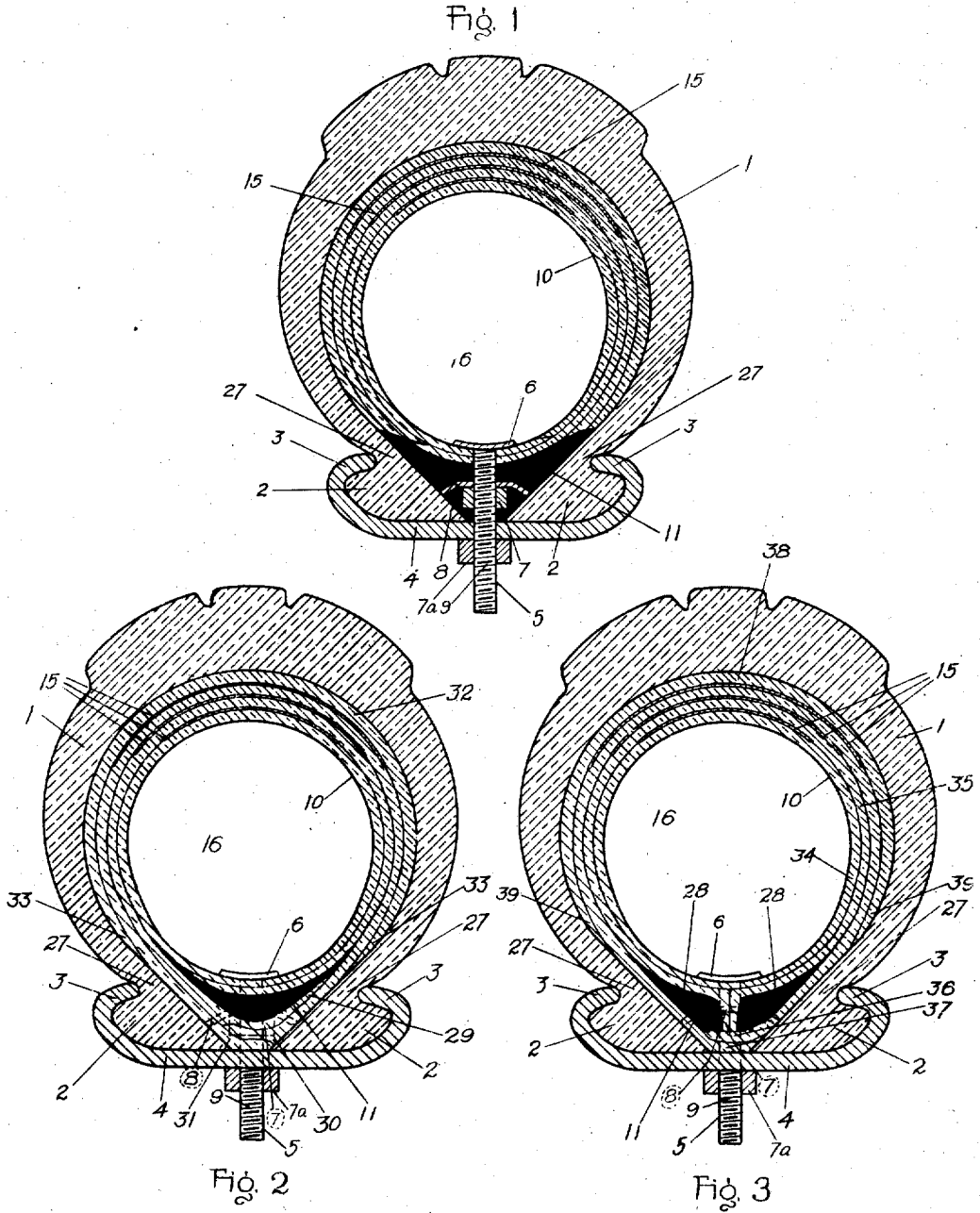

1,258,505.

Patented Mar. 5, 1918.
4 SHEETS—SHEET 2.

Inventor:
Harry B. Wallace
By Hugh H. Wagner
His Attorney.

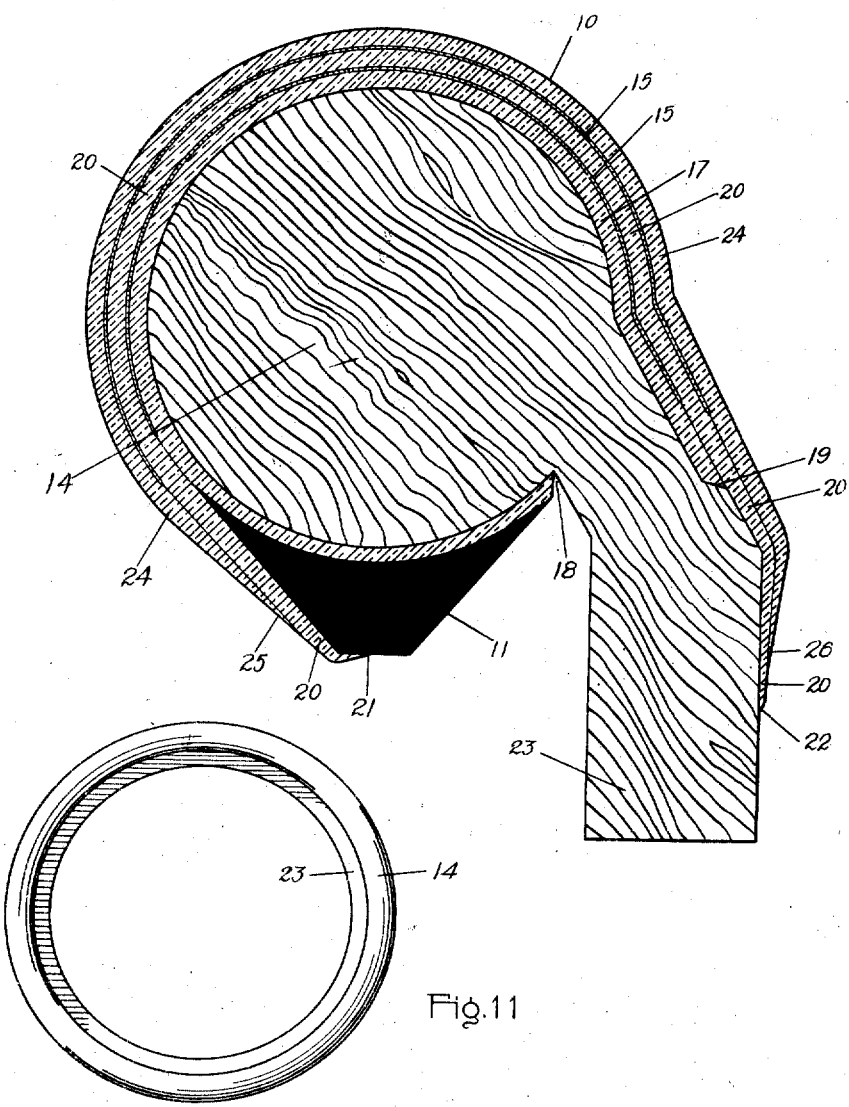

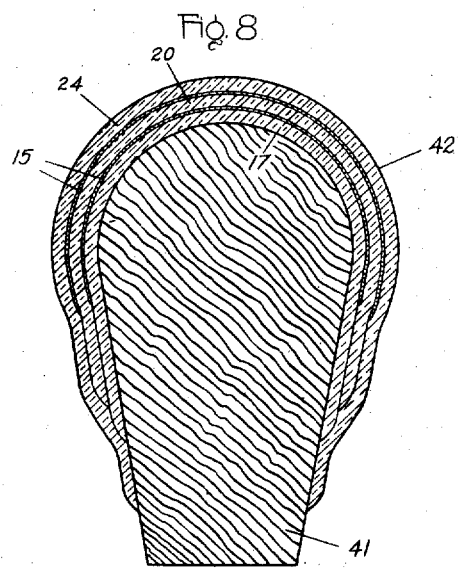
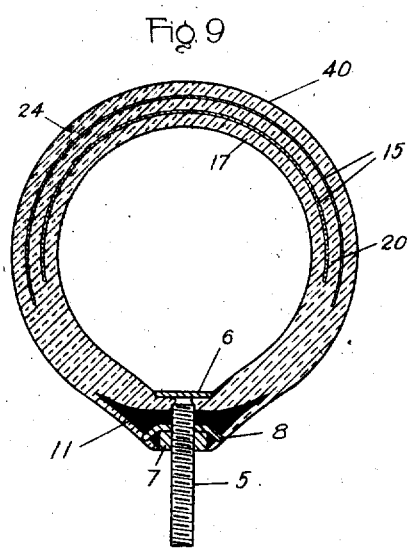
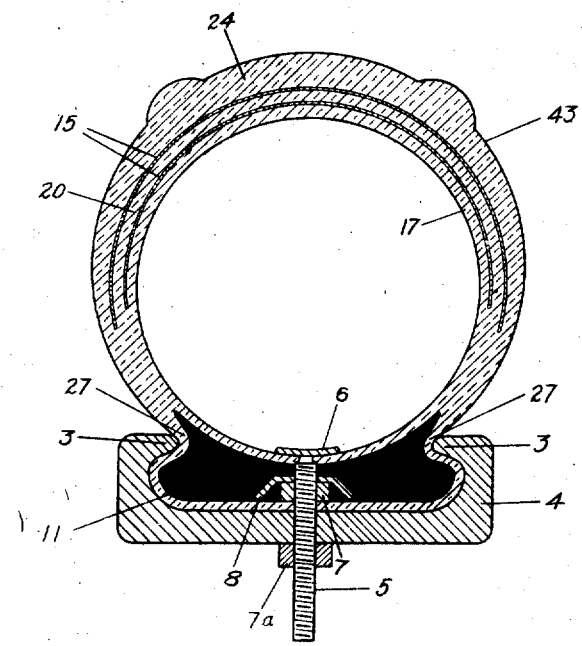

UNITED STATES PATENT OFFICE.

HARRY B. WALLACE, OF ST. LOUIS, MISSOURI.

TIRE.

1,258,505.      Specification of Letters Patent.      Patented Mar. 5, 1918.

Application filed August 18, 1916. Serial No. 115,638.

*To all whom it may concern:*

Be it known that I, HARRY B. WALLACE, a citizen of the United States, residing at the city of St. Louis, in the State of Missouri, have invented certain new and useful Improvements in Tires, of which the following is a specification.

This invention relates to tires, especially of the kind that are used on automobiles, and more particularly to the construction of the inner tubes intended to be inclosed in the outer casings of pneumatic tires for automobiles, although it may be applied, also, to the manufacture of casings minus inner tubes and adapted to the combined function of holding air and serving as a road-contacting member.

The objects of this invention are, among others, to make the part of the inner tube that is adjacent to the tread of the tire stronger and to that extent puncture proof; so to construct the said inner tube as to eliminate "blow-outs" from "rim-cuts," and, also, to eliminate "pinches"; to eliminate the transverse seam customarily found in inner tubes; to facilitate, and therefore cheapen, the process of manufacture; and to produce other advantages that arise from the method of manufacture and apparatus and inhering in the construction hereinafter described.

When used as an air-holding casing without an inner tube, "pinches" are eliminated; "blow-outs" from "rim-cuts" are obviated, because of a preventive element; and the same cheap and effective method of manufacture may be used as above mentioned for the manufacture of inner tubes.

In the accompanying drawings forming part of this specification and in which like numbers of reference denote like parts wherever they occur, Figure 1 is a sectional view through a casing of ordinary construction having the inner tube of this invention inflated therein, the said inner tube being, also, shown in section;

Figs. 2 and 3 are similar sectional views, but illustrate modifications of this invention;

Fig. 7 is a sectional view of a preferred form of core upon which the said inner tube may be built, showing an incomplete inner tube on the said core just before being removed therefrom to be completed and placed in the mold for curing;

Fig. 8 is a transverse sectional view illustrating another form of core for forming a seamless inner tube of the same shape in cross section as an ordinary casing and upon which the same can be formed in accordance with the herein-described method;

Fig. 9 is a transverse sectional view illustrating after vulcanization a seamless inner tube of the kind just mentioned formed on the core shown in Fig. 8;

Fig. 10 is a transverse sectional view illustrating a complete airtight casing and tube combined made in accordance with this invention; and Fig. 11 is a side elevation of a full core of the form shown in Fig. 7, but on a relatively reduced scale, and looking at the same from the right of Fig. 7 without any material thereon.

Figure 4:
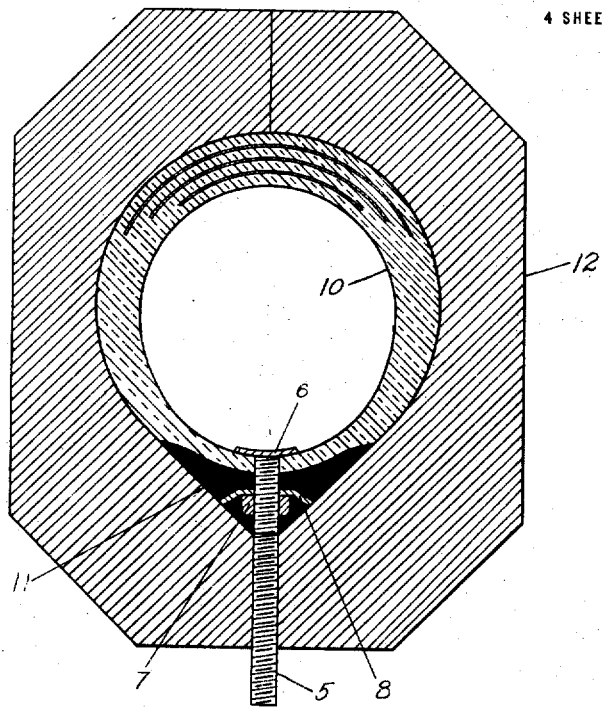
Fig. 4 is a sectional view illustrating an inner tube of this invention contained in the mold in which it is cured.

This invention will first be described as for inner tubes to be inserted in casings, and later the same will be described in connection with a construction comprising an airtight casing which does not require the use of an inner tube.

The casing 1 may be an ordinary casing of any ordinary or well known construction, and may be either of clencher, quick detachable clencher, or straight side type, but is shown in the drawings as of the clencher type, having the customary beads 2, which are held by the flanges 3 of the rim 4 of the wheel (not shown).

The valve 5 may be of any ordinary construction, and is held within the inner tube by its flanged head 6 and the nut 7, which bears upon the keeper-plate 8, the said nut 7 rotating upon the threads 9 on the exterior of the valve 5. It is to be understood that the head 6 of the said valve 5 is inserted within the inner tube 10 before the same is vulcanized and drawn down tightly against its wall. The keeper-plate 8 is then slid along the valve 5 until it comes in contact with the ring 11 attached to the inner tube 10 and forming part thereof; and the said head 6 and the said plate 8 are then drawn together by the turning of nut 7 on the threads 9. The inner tube is then placed in the mold 12 for vulcanization, as shown in Fig. 4.

It will be observed from an examination of Figs. 1, 2, 3, and 10 that when the nut 7ª is turned into place on the inside of rim 4, as is customary in attaching tires to wheels, the ring or member 11 will be drawn toward rim 4 in such manner as to cause the same to act as a wedge between the flanges 3 or similar parts, and thus increase the tightness of connection between the tire and the wheel-rim, the said ring or member 11 being of hard or semi-hard material as compared with the more flexible or resilient material outside of, or adjacent to, the same.

Heretofore inner tubes for tires have been formed in longitudinal tubular form on long metal calendar rolls or mandrels and thus cured and later bent into annular form and joined at their ends by a transverse seam and the said transverse seam vulcanized. The said transverse seam has been a point of weakness and a place where leaks resulting in flat tires have often occurred. The said calendar rolls bearing the inner tubes during the said curing are out of use for shaping purposes during the process of curing, being used in curing as internal molds. In lieu of the said rolls, air or other fluid under pressure is used in the process of this invention as a form during curing. The molding cores 13 and 14 shown in Figs. 5, 6, 7, 8, and 11 of the drawings may be made of wood, because, according to the herein-described process of molding and curing, it is not necessary to introduce the said cores into the curing oven, but one of the advantages of this invention is that it provides for the removal of the molded tube from the molding core before introduction into the curing oven. Metal cores are, moreover, more expensive than those made of wood or similar material. The cores illustrated and described herein may be collapsible, if desired, but need not necessarily be so, and they may be made not alone of wood but of any desired material.

Embedded in the rubber material of the inner tube 10 is a strip or a plurality of strips of fabric of textile or other protective material 15 adapted to stop the entrance of any penetrating point or instrument that may have pierced the casing 1 and begun to pass through the tube 10. It is, of course, well understood that the air contained within air space 16 inside the inner tube 10 cannot escape until a puncture has been made through the entire thickness of tube 10, including the fabric strips 15.

Certain other features of the construction of this invention will be best understood when stated in the following description of the method of manufacture of these tires.

Figure 5:
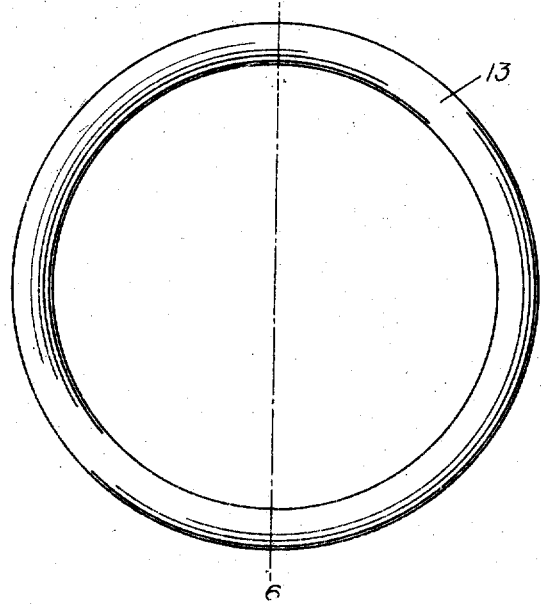
Fig. 5 is a side elevation of one form of core on which the inner tube of this invention may be formed.
Figure 6:
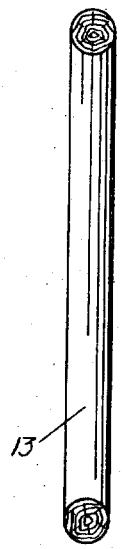
Fig. 6 is a sectional view of the same on the line 6—6, Fig. 5.

The method of making one of these tubes is substantially the same whether the molding core depicted in Figs. 5 and 6 or the other form of molding core depicted in Fig. 7 or that form of core shown in Fig. 8 or any other shape of core is used and whether the product is of the form shown in Fig. 1 or that shown in Fig. 7 or in the optional forms illustrated in Figs. 2, 3, and 10. The necessary changes in steps can easily be made according to which form of product is desired, but the method will first be described in connection with Fig. 7.

The core or tire mold 14 is first placed in position on a tire mold holder of ordinary construction, which holder is not illustrated in the drawings. Then upon and around the said core 14 annularly and nearly circumferentially a layer 17 of plastic rubber is laid and worked upon the core 14 from the notch 18 all the way around to the shoulder 19. Then at and to each side of the tread part of the tire a layer 15 of fabric is worked upon the said layer of rubber 17 so as to adhere thereto. After this a second ply of plastic rubber 20 is laid upon said fabric ply 15 and worked thereon and from a point located approximately at the point marked 21 all the way around to approximately the point marked 22 upon the flange 23 of core 14, the hard rubber or semi-hard rubber or built-up fabric bead or ring 11 having previously been placed within the core 14 and closely fitting and adhering more or less to the plastic rubber material 17. Following the placing and working of plastic rubber material 20, another ply of fabric 15 is placed thereon and worked thereupon like the fabric layer last mentioned, and then the outer ply of plastic rubber 24 is laid in place and worked upon the ply of fabric 15 underlying the same, near its ends 25 and 26 being chamfered or tapered so as to end in smooth connection with and adhesion to ply 20. In the foregoing description, where rubber or fabric is said to be worked upon an underlying member, it is understood that the same is accomplished by suitable hand or other tools, such as rollers, knives, mallets, pestles, or the like.

After the inner tube has been constructed as hereinbefore described, it is slipped off the core 14 by loosening it at the point 22 (of course, if a collapsible core is used it is simply collapsed), and then that part of the same adjacent to the said point 22 when on the core is brought together with the opposing side, so that the part of the tire that when on the core lies adjacent to the shoulder 19 meets with that part of the tube which when on the core is located at the notch 18, and that part of the tube which when on the core extends from the shoulder 19 to the point marked 22 is caused to adhere to the outside of the ring 11, covering the same all the way from the part which on the core is adjacent to the notch 18 to the point marked 21. A hole is formed in ring 11, as indicated in Figs. 1, 2, 3, 4, 9, and 10 (but not shown in Fig. 7) through which the stem of the valve 5 is inserted, as hereinbefore described, and the same protrudes outwardly through the ring 11 and that part of the plastic rubber tube material that extends when on the core from the shoulder 19 to the point marked 22. The said part of the tube, being of plastic rubber, is easily molded around the said valve 5.

After the tube has been formed in the manner hereinbefore described and all the parts thereby caused to adhere more or less to adjoining parts by reason of the adhesiveness of the plastic rubber plies, the tube is placed in a two-piece mold, as depicted in Fig. 4 in sectional view, which mold has a hole between the two sections, enabling the valve 5 to protrude therethrough. Air or other fluid is injected through the said valve, so that the tube is inflated to the full size of the mold or to any other size desired, any suitable closure (not shown) is applied to the mouth of the valve 5, and the mold 12 containing the tube is introduced into the curing oven. By this method of manufacture, it will be observed that the valve stem is vulcanized in its place in the tube at the same time and by the same operation as when the tube is vulcanized, and, furthermore, that no transverse seam occurs in the tire and that none such needs vulcanization. Due to the fact that plastic rubber is pressed upon and worked to adhere to the ring or bead 11 and thereafter the whole is cured by baking, the tube produced as hereinbefore described may properly be described as a seamless tube, because the vulcanization thereof amalgamates all its parts into an integral structure. Moreover, the fact that ply 17 of the rubber overlaps the ring 11, while the plies 20 and 24 underlap the same (the whole being vulcanized into one integral mass), negatives the presence of a seam containing possibilities of leakage.

It should be noted that in Figs. 1, 2, and 3 the inner tube 10 is shown as inflated to approximately a close or tight fit with the inside of the casing 1, but, if desired, a slight air space may be left between the said inner tube and the part of the inside of the casing 1 adjacent to its tread, the same being accomplished merely by the introduction of less air. Due to the fact that the tread side of the tube preferably contains protective strips 15, inflation of the tube will expand first the parts away from the said strips and thus leave such air space opposite the tread.

One of the commonest causes of what are known as "flat tires" is what are called "pinches," and these usually occur in that part of the tube adjacent to the rim; but "pinches" are obviated by the construction of this invention due to the fact that the ring 11 is incapable of being "pinched," while the fabric strips 15 so protect the tread part of the tube as to prevent "pinches" there or anywhere where the said fabric strips 15 extend.

Another common cause of "flat tires" is "rim cuts" on the edges of the casing adjacent to their attachment to their respective rims. When the wall of a casing at a point like 27 (Figs. 1, 2, and 3) becomes thin by the rim cutting therethrough, the pressure from the inside out of the compressed air contained within the inner tube produces a "blow-out" at, for instance, such a point as 27. In the preferred construction of the ring 11, as shown in Figs. 1, 2, 3, and 10, the bead or ring 11 will extend higher than the flanges 3 of the rim 4 and prevent "blow-outs" due to rim-cutting, because there can be no "blow-outs" through ring or bead 11.

In Fig. 3 the bead or ring 11 consists of a pair of members 28 of material like that hereinbefore mentioned in connection with ring 11, which members 28 become amalgamated into one in the hereinbefore-described process of vulcanization with the valve 5 in place between and cemented to them.

Figs. 1, 2, and 3 differ from each other in respect to the arrangement of plies of rubber and in the same respect differ more or less from Fig. 7. In Fig. 1 the plies of rubber are shown as separated by strips of other fabric 15 and as coming to a common point immediately above the ring 11, to which they become welded by vulcanization. In Fig. 2 one ply of rubber forms a tube; the next outer ply of rubber underlies the same and rests upon the top of the ring 11 and encircles the first-mentioned tubular ply of rubber and at its other end 29 underlies and underlaps the said ring 11. The next outer ply underlaps the end 29 aforesaid at 30 and encircles all within it and underlies its end 30 at 31. Rubber ply 32 lies outside of all the aforementioned plies, but does not completely encircle the same, its end being chamfered at 33.

In Fig. 3 the inner tube 10 is made of a tubular ply 34, which lies above the ring 11 composed until vulcanization of the two semi-hard rubber members 28. Outside of the plastic rubber ply 34 is another tubular plastic member 35 separated from the ply 34 by a fabric strip 15. Superimposed upon ply 35 is another fabric strip 15, outside of which is a plastic rubber ply that begins at 36 and ends at 37, its said ends 36 and 37 overlapping each other, while the rest of the said ply encircles the plies 34 and 35. Overlying the ply having the ends 36 and 37 is ply 38, which does not encircle the last-mentioned ply, and has chamfered ends 39.

One advantage of forming an inner tube upon an annular core like those herein described and illustrated, rather than upon long calendar rolls or mandrels, is that the right amount of material will be spread upon the outer surface of the said core and a lesser amount upon the inner surface of such core and the said material is molded in the right manner in its curvilinear form. A straight tube that is subsequently bent into annular shape naturally tends to break and crack on the inside of the curve because it has too much material there for its curvature and tends likewise to break and separate on its outer circumference because it has relatively too little material there.

It should be understood that in the forms illustrated in Figs. 1, 2, 3, 7, 9, and 10 the valve 5 is cemented to the tube and within the ring 11 in the process of vulcanization or curing of the tube. In the form shown in Fig. 3 all that is necessary for its location in position is that it shall be inserted between the members 28, while in the form of ring 11 shown in Figs. 10, 9, 7, 2, and 1, in which the said ring is composed of a single member, it is necessary to leave a hole through which it can be passed.

The tube when placed in the mold 12 may be inflated with air or other fluid under pressure, which serves as a form upon which the tire is held while being vulcanized, obviating the use of metal cores as such internal molds.

While the foregoing description has been applied to the manufacture of what are known as inner tubes for pneumatic tires, the same principles of construction and method of manufacture may be, *mutatis mutandis*, applied to the making of casings, as illustrated in Fig. 10, in which the use of an inner tube is dispensed with, and the tire 43 (built up of plies of plastic rubber in substantially the same manner as described in connection with Fig. 7) serves as a combined inner tube and casing. The tire of Fig. 10 has the ring 11, valve 5 and connected parts, and the alternated plies of rubber and protective fabric hereinbefore described in connection with Figs. 1, 2, 3, and 7. The function of the ring 11 shown in Fig. 10, though having a somewhat different shape from that of the same member shown in the said other figures, is the same as hereinbefore described, namely, at the point 27 to prevent " blow-outs " from " rim-cutting " and, also, to prevent " pinches."

Within the method of making tires herein described and within the contemplation of the scope of this invention is a seamless inner tube 40 (see Fig. 9) of substantially the same shape and size as the inside cavity of an ordinary outer casing within which the said tube is to be used, the said inner tube being built upon a core 41 (see Fig. 8). If the core 41 is of the collapsible kind, it is removed from the inside of the incomplete tube 42. If the core 41 be not collapsible, the incomplete tube 42 is removed therefrom by lifting the flap at one side thereof. In either event, the opposing flaps of incomplete tube 42 are brought adjacent to each other, a ring 11 is inserted in position between the same in substantially the same manner as hereinbefore described in connection with Fig. 7, a valve 5, having a head 6, a keeper-plate 8, and a nut 7, is passed through a hole in the said ring 11 in the same manner as hereinbefore described, and the opposing flaps of the incomplete tube 42 are then overlapped in connection with the said ring 11 and with each other, so as to form an inner tube substantially such as that illustrated in Figs. 1, 2, 3, and 9, and the whole vulcanized, whereby the valve 5 is vulcanized in place in the said tube at the same time and operation as the vulcanization of the said tube.

In Figs. 1, 2, and 3 the plies of plastic rubber from which the tubes are built up in the manner described in connection with Figs. 7 and 8 are indicated, although the process of vulcanization so blends the same together as to make the plies of plastic rubber an integral mass such as better illustrated in Figs. 4, 9, and 10.

It has been found in practice that a superior quality of tire is produced if cooling means is applied thereto immediately upon removal from the vulcanizing or curing oven—that is to say, before the air or fluid pressure within the same is reduced or released.

It is evident that the herein-described process of manufacturing tires is much cheaper than any heretofore practised, for the following, among other, reasons: separate vulcanization of a transverse seam is obviated, because in these tires there is no transverse seam; separate vulcanization of the valve into place in the tire is obviated, because that is done simultaneously with the curing of the tire; instead of introducing the shaping cores into the curing molds (thus putting out of use the said cores during the process of curing), the tires are removed from the said cores and they are molded in the curing process upon the natural core of air or other fluid introduced into the same through the valve immediately before being placed in the curing oven; the way of laying and working the plies from which the tire is built up is simpler and more convenient in this method than in others; leaks are obviated by this process and thus no waste tires need to be discarded; and the product produced is superior in quality and serviceability and, therefore, nets a larger result to the manufacturer.

One of the reasons why tires (or tubes) as herein described are more durable than those otherwise constructed is that less pressure is necessary for adequate air inflation thereof. Another reason is that they are better cushioned on the tread.

The inner tubes made in accordance with this invention to be used in outer casings can be shaped so as to fit exactly the interior contour of such an outer casing, instead of being made in the tubular form now practised on mandrels or calendar rolls. When such a tubular inner tube is placed inside a casing, it assumes the wedge shape of the interior contour of the casing only by reason of the air pressure being so excessive as to force it out of its own tubular shape and so as to assume any shape possible to give it by expansion. The herein described method of manufacture, however, allows the inner tube to be conformed in manufacture to the shape of the interior contour of a casing (which, as at present practised, is somewhat wedge shape), and the result is that when air inflation takes place it is not necessary to introduce an enormous pressure adequate to force a tubular-shaped inner tube into the shape demarked by the outer casing, but the introduction of slight air pressure causes the walls of the inner tube of this invention (shaped in manufacture to conform to the inner contour of the casing) to take the shape of the interior contour of the casing, and a very slight additional pressure will impart to the tire all the resiliency necessary. One of the greatest causes of deterioration in tubes and casings is the excessive pressure from within the same caused by air inflation adequate to meet present conditions; but with the inner tubes of this invention half the air pressure commonly applied in other makes is sufficient. For this reason, it has been found in actual practice that a casing of ordinary make having a weak spot or weak spots from cuts or other causes which would result in an immediate "blow-out" if inflated adequately for the insertion of an ordinary inner tube of the kind customarily now in use can not only be used with a tire of the kind herein described shaped to conform to the interior contour of the casing, but will give long augmented service.

It is well known that tires that are highly inflated with air are "hard-riding", while tires with air under inflated, i. e., having a less degree of air-pressure within the same, are "easy-riding". It is, therefore, another advantage of this invention that, while adequately inflated with half the air-pressure properly necessary for other tires, the tires of this invention are "easy-riding", because of the less degree of air-pressure used in properly inflating the same. This is an advantage for any kind of car, but is a particular advantage in ambulances, pleasure cars, and the like. The more gently a car rides the less will be the vibration and, consequently, deterioration of all parts. It will be observed that in Figs. 1, 2, 3, 4, 7, 8, and 9 of the drawings the inner tube is in each case indicated as having a wedge-shaped form toward the bottom and shaped otherwise corresponding substantially to the interior contour of an ordinary outer casing.

While the ring 11 has been herein mentioned as an element used together with other elements, such, for instance, as the plies of rubber or the plies of fabric or the valve, nevertheless it should be clearly understood that after vulcanization of the tire or tube the whole constitutes an integral mass in which the individual elements, such, for instance, as the said plies of rubber and the ring and the said plies of fabric and the said valve, are fused together and constitute a single unitary article. It should be also understood that, while, for purposes of convenience and in order to give an example of one form of this invention, the ring 11 has been described as being an element used while the tire or tube is in the making, nevertheless the same may be omitted entirely and the other building elements united and vulcanized into a unitary whole.

I claim:

A pneumatic tire provided with a cross-sectionally wedge-shaped, circumferential rib, of harder material than the tire, the base of the wedge extending above the flanges of a wheel rim when the tire is mounted thereon.

In testimony whereof I hereunto affix my signature.

HARRY B. WALLACE.